United States Patent [19]
Roberts et al.

[11] Patent Number: 5,310,964
[45] Date of Patent: May 10, 1994

[54] ELECTRIC AND COMMUNICATION CABLES

[75] Inventors: David G. Roberts, Llangollen; Mark S. Lloyd, Wrexham, both of Great Britain

[73] Assignee: BICC Public Limited Company, London, England

[21] Appl. No.: 917,316

[22] Filed: Jul. 23, 1992

[30] Foreign Application Priority Data

Jul. 23, 1991 [GB] United Kingdom ............... 9115888.1

[51] Int. Cl.⁵ .................................................. H01B 7/34
[52] U.S. Cl. ......................... 174/121 A; 174/105 SC; 174/106 SC; 174/107; 174/116; 174/121 SR
[58] Field of Search ........ 174/121 A, 121 R, 105 SC, 174/106 SC, 107, 116, 121 SR

[56] References Cited

U.S. PATENT DOCUMENTS

| | | | |
|---|---|---|---|
| 2,234,068 | 3/1941 | Wiseman | 174/105 R |
| 3,602,636 | 8/1971 | Evans | 174/121 SR X |
| 3,745,233 | 7/1973 | Lania et al. | 174/121 A |
| 3,823,255 | 7/1974 | La Gase et al. | 174/121 A X |
| 4,197,380 | 4/1980 | Chao et al. | 525/199 |
| 4,280,225 | 7/1981 | Willis | 174/121 A X |
| 4,401,845 | 8/1983 | Odhner et al. | 174/121 A X |
| 4,510,348 | 4/1985 | Arroyo et al. | 174/121 A |
| 4,549,041 | 10/1985 | Shingo et al. | 174/121 A X |
| 4,595,793 | 7/1986 | Arroyo et al. | 174/121 A |
| 4,600,806 | 7/1986 | Beretta | 174/121 A |
| 4,605,818 | 8/1986 | Arroyo et al. | 174/107 |
| 4,659,871 | 4/1987 | Smith et al. | 174/121 A |
| 5,006,670 | 4/1991 | Plant | 174/106 SC |

FOREIGN PATENT DOCUMENTS

| | | | |
|---|---|---|---|
| 78087 | 7/1978 | Japan | 174/121 A |
| 28412 | 3/1981 | Japan | 174/121 A |
| 65004 | 3/1990 | Japan | 174/121 A |
| 2059140 | 4/1981 | United Kingdom | 174/121 A |

*Primary Examiner*—Morris H. Nimmo
*Attorney, Agent, or Firm*—Oliff & Berridge

[57] ABSTRACT

A cable comprising a core enclosed in an external sheath of a char-forming low-smoke-and-fume composition is characterized by a tape of flexible mineral material, preferably a woven glass-fiber tape, wrapped round the core and by an adhesive bonding the tape to the sheath. Hot-melt adhesives based on ethylene/vinyl acetate copolymers with tackifier resins are suitable. By bonding the sheath to the underlying tape, retention of the charred remains of the sheath under fire conditions is considerably improved with consequent improvements in flame retardance, smoke levels and fire survival.

5 Claims, 2 Drawing Sheets

ELECTRIC AND COMMUNICATION CABLES

This invention relates to electric and communications cables (including optical cables) and more particularly to cables for use in installations in which performance under fire conditions is of importance. Nearly all cables must include substantial amounts of combustible materials, and where this might contribute to fire hazard, it is important that the cable should
   (a) contribute as little as possible to the spread of flame (flame retardance)
   (b) contribute as little as possible to the generation of obscuring smoke and hazardous fumes (low smoke and fume) and
   (c) continue to function for as long as possible (fire survival), at least if the cable supplies information, lighting or power required for rapid and safe evacuation and/or for fire-fighting.

All three objectives can be helped by features of cable design that tend to maintain the integrity of the cable structure during at least the early stages of exposure to fire conditions.

Modern cables for fire conditions usually have an external sheath made of a low-smoke-and-fume flame retardant composition based on a suitable polymeric material heavily filled with alumina trihydrate or other mineral filler that evolves water and absorbs heat in doing so at temperatures above ambient temperature but below the temperature at which the polymeric material ignites or pyrolyses at a rapid rate. Such compositions are halogen-free, eliminating the risk of fumes containing hydrogen halide gases, and when exposed to fire conditions they burn relatively slowly and evolve only small quantities of pale smoke by comparison with cables sheathed with the PVC or polychloroprene compositions that were formerly used. Moreover, many of these low-smoke-and-fume sheathing compositions, when burned by exposure to external fire, form a char composition with a degree of cohesion rather than a powdery ash, and this has the potential to contribute to fire performance by maintaining thermal insulation between the external fire and the underlying parts of the cable; however, this potential has not hitherto been fully realised because the charred sheath breaks up and becomes detached from the cable in a relatively short time, and often before char formation has extended through the full thickness of the sheath. When this happens, not only does the char no longer protect the cable, but the newly-exposed pre-heated and incompletely charred sheath fragments are liable to burn rapidly, producing a short-term localised temperature rise that may cause further disruption of the cable structure.

We have now discovered that by modifying the cable structure, the charred sheath can be retained in position for a substantially longer time, leading to extended fire survival, a lower rate of smoke and fume generation and (under some conditions) reduced flame spread.

SUMMARY OF THE INVENTION

In accordance with the invention, a cable comprises a core enclosed in an external sheath of a char-forming low-smoke-and-fume composition and is characterised by a tape of flexible mineral material wrapped round the core and by an adhesive bonding the tape to the sheath.

The core may be of entirely conventional structure and composition, and will include at least one insulated conductor and/or at least one optical fibre; ideally substantially all combustible materials in the core would be of the low-smoke-and-fume type, but substantial amounts of other relatively low fire-hazard materials (for example polyethylene) may be acceptable. Compositions that evolve large amounts of gas under fire conditions are best avoided, because of the risk of generating enough pressure to disrupt the cable structure. The core may include an inner sheath or bedding layer, and will often include an armour layer of wire or metal tape, usually as the outer layer of the core.

The sheath may be of any conventional low-smoke-and-fume composition, provided it is char-forming.

The tape is preferably a woven glass-fibre tape, but non-woven glass fibre tapes and other flexible mineral tapes (such as mica tapes, with or without glass fibre reinforcement) could be used if preferred. Especially when the tape is formed by slitting a wider sheet, it is preferably pre-coated (on the side to be applied next to the core) with a bonding material to inhibit escape of fibre or other mineral fragments. Low-smoke-and-fume cable-making compositions are suitable bonding materials.

The adhesive is preferably a heat-activated adhesive that is solvent-free at least when ready for use. A hot-melt adhesive based on an ethylene/vinyl acetate polymer and a tackifying resin has given good results, but the use of other adhesives (including thermosetting adhesives) is not excluded.

Preferably the adhesive is pre-coated on the tape; it may form a continuous layer, but a discontinuous layer (scatter coating) is preferred as it may reduce risk of trapping air during application. The amount of adhesive should be as small as is consistent with being sufficient to ensure a substantially continuous bond to the sheath.

The invention will be further described, by way of example, with reference to the accompanying drawings, each of which is a diagrammatic cross-section of one design of electric cable in accordance with the invention.

BRIEF DESCRIPTION OF THE DRAWING

The invention will be described in detail; with reference to the following drawings and in which like reference numerals refer to like elements and wherein.

DETAILED DESCRIPTION OF PREFERRED EMBODIMENTS

Figure 1:
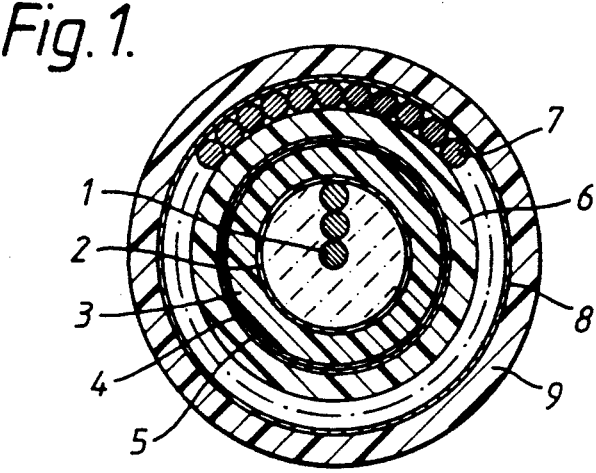
FIG. 1 is a cross-sectional view of a single-core cable of a preferred embodiment of the present invention.

The cable shown in FIG. 1 is a single-core 6.35/11 kV power cable comprising a 500 mm$^2$ stranded aluminium conductor 1 with a semiconducting conductor screen 2, crosslinked polyethylene dielectric 3 (nominally 3.4 mm radial) and semiconducting dielectric screen 3, over which is applied a copper tape screen 5 and a bedding 6 of a conventional ethylene/vinyl acetate based low-smoke and fume composition; a layer of aluminium armour wires 7 completes the core of the cable.

Figure 3:
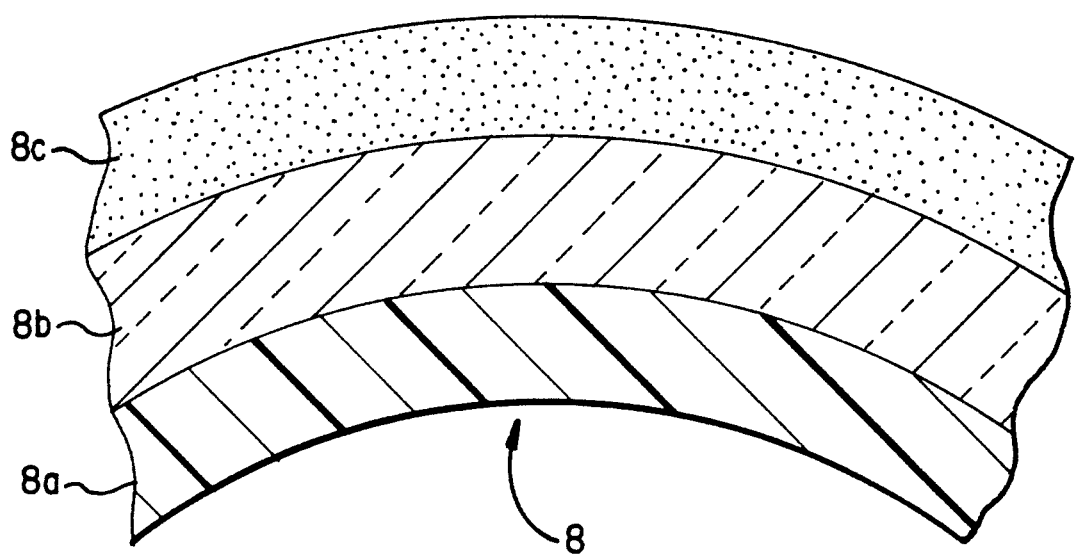
FIG. 3 is a side view of the coated glass fiber tape of the present invention.

In accordance with the invention, over the armour wires is applied a coated glass-fiber tape 8. FIG. 3 shows the coated glass fiber tape 8 in an enlarged side view. The glass substrate 8b of the tape has a nominal thickness of 0.093 mm and is woven from 157×125

E-glass fibers per decimeter, both warp and weft fibers being 34 Tex (34 g/1000 m) and being treated with a conventional size to promote adhesion. One side 8a of the tape 8 is coated by extrusion with 40 g/m² of the same conventional low-smoke-and-fume composition as used for the bedding layer and the other side 8c scatter-coated with 40 g/m² of a conventional ethylene/vinyl acetate copolymer-tackifier hot-melt adhesive. The tape 8 is cut to a width of 50 mm and helically applied to the cable core, adhesive side 8c out, with one third overlap.

Over the tape 8 is applied by extrusion at a temperature of about 140° C. (so as to activate the adhesive) a sheath 9 of the same low-smoke-and-fume sheathing composition used for the bedding and for the coating on the tape, which is a char-forming composition; the sheath has a radial thickness of 2,52 mm and the complete cable has a nominal diameter of 51.1 mm.

The cable of this example fully met the requirements of IEC Specification 332 Category A, whereas a comparable cable without the tape layer only satisfied Category B.

Figure 2:
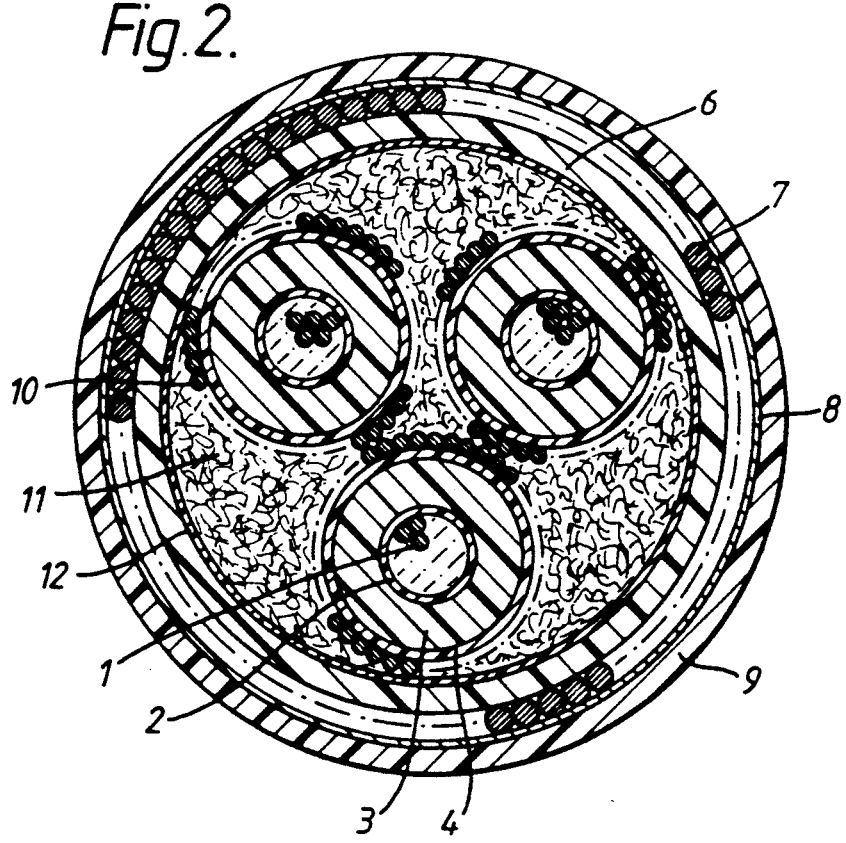
FIG. 2 is a cross-sectional view of a three-core cable of a preferred embodiment of the present invention.

The cable of FIG. 2 is a three-core 22 kV cable of generally corresponding structure, and the same references are used to identify corresponding parts. Each of the conductors 1 has a nominal cross-section of 240 mm² and is made up of 60 copper wires each 2.33 mm in diameter; the screens 2 and 4 are of polyethylene-based semiconducting compositions incorporating 16% (by weight) of carbon black and are respectively of 0.80 and 1.0 nominal radial thickness, and the insulation 3 of a dielectric-grade polyethylene composition; the polyethylene in the insulation and both screens is cross-linked by a conventional one-stage silane curing technique (GB 1526398). In this example, over each of the dielectric screens 3 is applied a layer 10 made up of 35 copper wires, each 0.67 mm in diameter applied with a right-hand lay of 280 mm. The three cores are laid up together with polypropylene twine fillers 11 having an aggregate mass of 0.749 kg per meter of cable length with a right-hand lay of 2140 mm. The resulting nominally circular assembly is enclosed with a nylon fabric tape 12 with a thickness of about 0.2 mm. Over this, the bedding layer 6, of the same composition as in the first example, is applied to a nominal radial thickness of 2.0 mm and a nominal overall diameter of 80.2 mm. The cable is armoured with 75 galvanized steel wires 7 each 3.15 mm in diameter applied with a left-hand lay of 670 mm, over which is applied the same type of coated glass-fibre tape as used in the first example; in this case the tape is cut to a width of 60 mm and applied with a right-hand lay and an overlap of 10 mm. The sheath 9 is again of the same composition as the bedding 6 and has a nominal radial thickness of 3.8 mm, completing a cable with a nominal diameter of 94.5 mm.

When tested in accordance with BS6724 Appendix F, this cable gave an $A_0$ value of 1.13; an otherwise identical cable made using no adhesive coating on the outside of the glass-fibre tape gave a value of 2.40.

What we claim as our invention is:

1. A cable comprising a core wrapped in a tape of flexible mineral material and enclosed in an external sheath of a char-forming low-smoke-and-fume composition based on an ethylene/vinyl acetate copolymer and having a hot-melt adhesive, wherein the adhesive is based on an ethylene/vinyl acetate copolymer and a tackifying resin and bonds said tape to said sheath.

2. A cable as claimed in claim 1, wherein the core includes an armour layer of wire or metal tape as its outer layer.

3. A cable as claimed in 1, wherein the tape is a woven glass-fibre tape.

4. A cable as claimed in 1, wherein the tape is pre-coated on the side applied next to the core with a bonding material to inhibit escape of fibre or other mineral fragments.

5. A cable as claimed in claim 4 in which the bonding material is a low-smoke-and-fume cable-making composition.

* * * * *